UNITED STATES PATENT OFFICE.

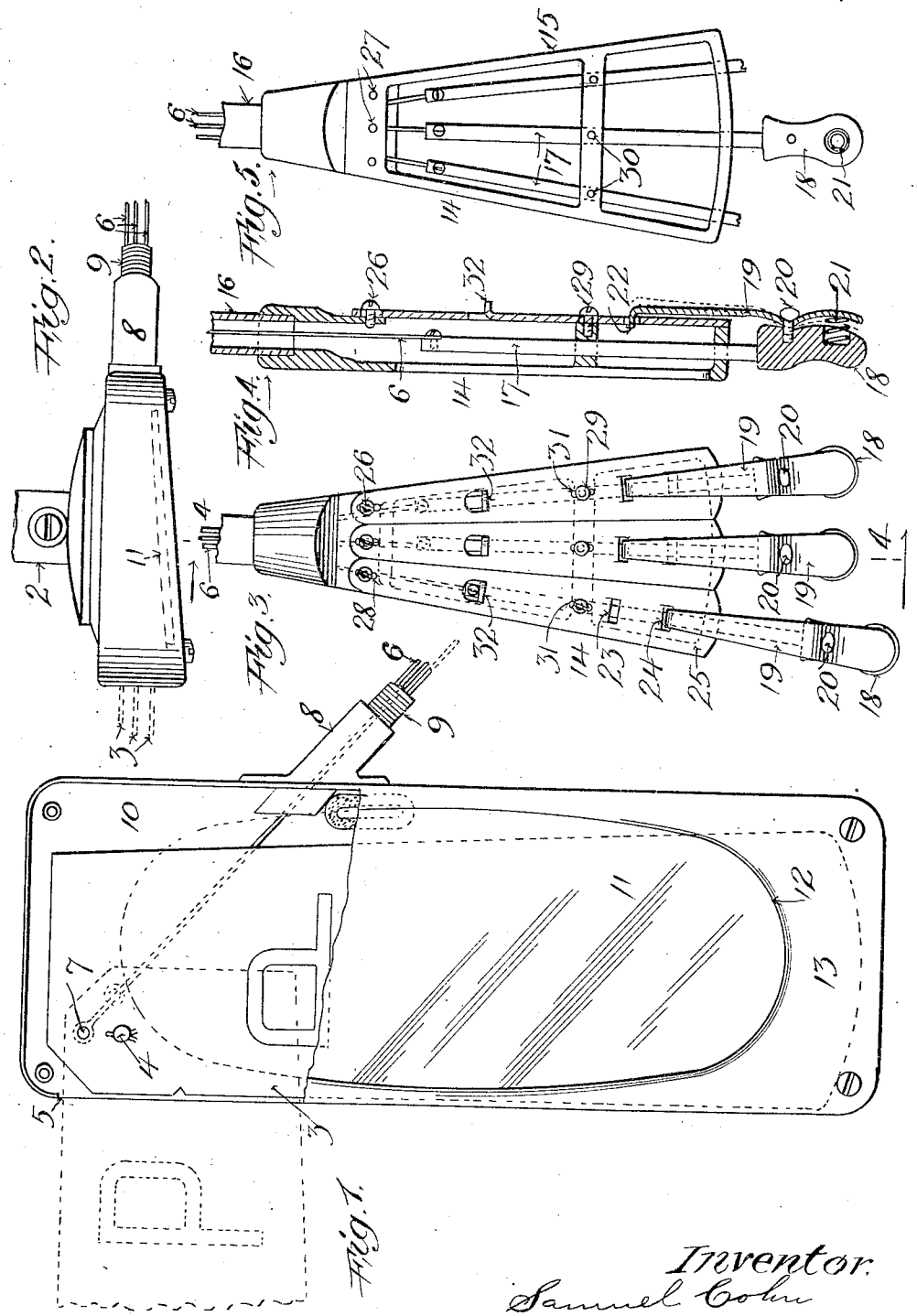
S. COHN.
AUTOMOBILE SIGNAL.
APPLICATION FILED JUNE 7, 1918.
1,292,713.
Patented Jan. 28, 1919.
Inventor.
Samuel Cohn
by his atty Charles H. Hensley

SAMUEL COHN, OF NEW YORK, N. Y., ASSIGNOR TO POLICE TRAFFIC AUTO SIGNAL COMPANY, A CORPORATION OF NEW YORK.

AUTOMOBILE-SIGNAL.

1,292,713.

Specification of Letters Patent. Patented Jan. 28, 1919.

Application filed June 7, 1918. Serial No. 238,653.

*To all whom it may concern:*

Be it known that I, SAMUEL COHN, a citizen of the United States, and a resident of the borough of Bronx, city and State of New York, have invented certain new and useful Improvements in Automobile - Signals, of which the following is a specification.

My invention relates to automobile signals of the semaphore type. The signal is adapted to be used on the forward part of an automobile being preferably attached to the windshield frame and it is adapted to be used for signaling to drivers of vehicles to the rear as well as to traffic officers ahead. In addition, the device includes a mirror by which the driver of the automobile may observe the approach or position of vehicles at the rear, the object being to provide a single device for both signaling and for rear observation. One of the objects of my present invention is to provide a device for the double purpose set forth of signaling and observing, wherein the semaphores or signal plates will be projected at the proper angle relatively to the automobile to render the signals clear and readable at the front and rear, and wherein the mirror for rear observation will at the same time have such an angle of inclination relatively to the plane of the signal plates that the driver may see the images of objects directly behind from his usual position at the steering wheel. Another object of my invention is to provide a signaling device comprising a signal box and signals, and a controller box, connected with the signal box by a pliable tube containing the operating wires or rods, together with simple and convenient adjustable means for locking the controlling members in either of their positions.

In the drawings forming part of this application,

Figure 1 is an elevation, with parts broken away, of the signal box and signals, Fig. 2 is a plan view thereof, Fig. 3 is an elevation of the controller box and associated parts, Fig. 4 is a sectional view taken on the line 4—4 of Fig. 3, and Fig. 5 is an elevation of the controller box with parts thereof removed.

The branch of the device which is connected with the windshield frame or other parts of the automobile so as to project therefrom, comprises the signal box 1 and associated parts. This signal box is connected by a bracket 2 with some part of the automobile in such manner that the box projects laterally at right angle therefrom. The signal plates 3 are pivoted to swing on the stud 4 near the upper part of the box 1 and they are adapted to hang within the box as shown in full lines in Fig. 1 or to be projected outwardly through the open side 5 of the box to the position shown in dotted lines, which is the signaling position.

There is a flexible connection for each signal plate, consisting of a wire or rod 6 connected to the signal plates at 7 and these wires pass through a connection 8 at one side of the box and thence through a pliable tube 9 which runs to the controller box to be described later.

When an operating wire is pulled it causes its corresponding signal plate to be swung out to signaling position and the plate will lie in about the same plane as the signal box, which is at right angle to the automobile on which the device is used. I have found that if these plates do not project exactly at right angle from the automobile but at an acute angle, it becomes difficult for persons directly ahead or directly behind the signaling automobile to read the signals quickly, and I have found that a very slight divergence from this right angle disposition of the signal plates will materially decrease the effectiveness of the signals. It is, therefore, necessary that the signal plates be projected at right angle to the automobile if they are to be clearly readable and if they are to be made of reasonable proportions. If the viewing mirror, however, is disposed exactly at right angle to the automobile, it is difficult for the driver to see the images of objects directly behind without leaning out. In the present case the stud 7 on which the signal plates are pivoted, is disposed at right angle to the front wall 10 of the signal box 1 so that the signal plates are projected in planes parallel to this front wall. The mirror 11, for viewing objects at the rear, is mounted just behind the opening 12 in the rear wall 13, and the latter diverges in relation to the front wall 10, so that the box 1 is wedge shape from side to side. The mirror 11 thus lies in a plane which diverges in relation to the planes of the several signal plates, as appears in Fig. 2. If the box 1 is positioned so that the signal plates are projected at right angle to the automobile then the mirror 11 will lie at less than a right angle or at an acute angle to the automobile and the driver may observe from his position at the steering wheel the images in the mirror of objects directly at the rear.

The pliable tube 9 is of sufficient length to extend from the signal box 1 to a controller box 14 which is fastened to the steering post (not shown) or to some convenient support near the steering wheel. One convenient method of attaching both the signal and control boxes is fully shown in my co-pending application Serial Number 214,710.

The controller box 14 consists of a frame 15 into which the operating wires 6 lead through a tubular connection 16 at one end. The bottom of the controller box may be conveniently left open. There is a rod 17 for each operating wire, there being three such rods shown herein; and they slide in suitable apertures in the frame 15 lengthwise of the several wires 6. Each rod 17 projects through the front end of the box and is provided with an operating knob or handle 18. There is a locking lever 19 pivoted at 20 to each of the operating knobs 18 so that they travel therewith, but they may be rocked in opposition to their springs 21 seated in the knobs. Each lever 19 has a turned in prong 22 adapted to engage in a locking slot 23 or 24 in the corresponding locking plate 25. There is a locking plate 25 for each rod 17 and they are individually adjustable in the direction of movement of these rods. I have shown screws 26 engaging in holes 27 in the frame 15 and passing through the slots 28 at the upper ends of the plates 25; and similar screws 29, engaging in holes 30 and passing through other slots 31 in the plates 25. By loosening the screws 26 and 29 of any given plate 25 the latter may be adjusted in the direction of movement of the rod 17; after which the screws are tightened to keep the plate in position. I have provided upturned lugs 32 on the several plates, which may be grasped when the plates are being adjusted in position.

The aperture or slot 23 in each plate 25 is adapted to receive the end 22 of a locking lever when the knob 18 is pushed in, that is, when the signal plate operated by the particular knob is retracted within the signal box. When a knob is pulled out to throw up a signal plate, the corresponding lever is disengaged from the aperture 23 and it engages the aperture 24 when the signal plate is in its proper signaling position. I have found that where the operating wires 6 are inclosed in a pliable tube 9 to permit the signal box to be properly positioned on any particular automobile and to permit the controller box to be suitably positioned on the steering post, that the disposition or shape of the pliable tube will be different in one application than another. If the devices for locking the knobs are so positioned that the knobs will be locked with the signals in the extreme extended or retracted position when the tube is in a straight line between the signal box and controller box, then the locking devices will not lock the signals in the same positions if the tube should be curved. The bending of the tube to permit the proper location of the boxes to suit the conditions in different automobiles changes the relationship of the locking devices to the signal positions. I have found that the distance the knob is moved when throwing the signal up or down remains the same and that when the bending of the tube requires an adjustment of the locking devices the distance between the latter remains constant. This makes it possible to use the very simple adjustment shown herein. If one of the plates 25 is adjusted along the controller box the corresponding lever 19 will lock in different positions but the distance between the slots 23, 24, or the distance between the inner and outer positions of the knob, remains the same. The plates 25 are adjustable independently of each other because the conditions may vary as between the several wires 6. When the signaling device is applied to any particular automobile and the plates 25 are adjusted so that the locking devices lock the several signals in their proper closed and extended positions it is not generally necessary to alter the adjustment for a long time.

Having described my invention, what I claim is:

1. A signaling device for the purpose set forth comprising a signal box and signal plates therein pivoted to be swung outwardly therefrom, and a mirror for rear observation, carried by said box and arranged in a plane which is angularly disposed in relation to the planes of the signal plates, for the purpose set forth.

2. A signaling device for the purpose set forth comprising a signal box having an open side, signal plates hinged in said box and adapted to be swung outwardly through said open side, said box being of tapered depth from side to side with the greater depth at said open side and a mirror for rear observation arranged at the rear wall of said box and arranged in a plane which is angularly disposed in relation to the planes of said signal plates for the purpose set forth.

3. A device of the class described comprising a signal box, signal plates pivoted therein and adapted to be swung to signaling position, members such as wires for actuating said signal plates whereby the latter may be operated at a distance from the signal box, and controlling means for said wires, comprising operating handles or knobs, locking members movable with said knobs and means adjustable relatively to the locking members and with which the latter coöperate to lock the signal plates.

4. A device of the class described comprising a signal box, signal plates pivoted therein and adapted to be swung to signaling position, members such as wires for actuating said signal plates whereby the latter may be operated at a distance from the signal box, a controller and a pliable tube connecting the signal and controller boxes and through which said wires extend, sliding rods in the controller box connected with said wires and projecting from said box, locking members movable with said sliding bars and locking plates independently adjustable in the direction of movement of said rods and with which said locking members coöperate to lock the signal plates in their extended and retracted positions.

Signed at the city, county and State of New York, this 14th day of May, 1918.

SAMUEL COHN.

Copies of this patent may be obtained for five cents each, by addressing the "Commissioner of Patents, Washington, D. C."